(12) United States Patent
Hiebel

(10) Patent No.: US 6,704,585 B1
(45) Date of Patent: Mar. 9, 2004

(54) PORTABLE TELEPHONE WITH FLAP HINGED TO ITS CASING

(75) Inventor: Claude Hiebel, Epinay (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/505,770

(22) Filed: Feb. 17, 2000

(30) Foreign Application Priority Data

Mar. 22, 1999 (FR) .............................................. 99 03516

(51) Int. Cl.$^7$ ................................................ H04M 1/00
(52) U.S. Cl. ................................ 455/575.3; 455/569.1; 455/90.3
(58) Field of Search .............................. 455/550, 575, 455/90, 550.1, 569.1, 596.2, 575.1, 575.3, 575.8, 90.3, 347, 128, 556.1, 557; 361/814; 439/188, 488, 489; 379/433.13, 433.2, 420; 200/61.7, 61.69, 61.81, 61.58 R

(56) References Cited

U.S. PATENT DOCUMENTS

| | | | | |
|---|---|---|---|---|
| 4,845,772 A | * | 7/1989 | Metroka et al. | 455/574 |
| 5,111,498 A | * | 5/1992 | Guichard et al. | 379/434 |
| 5,175,759 A | * | 12/1992 | Metroka | 379/63 |
| 5,465,401 A | * | 11/1995 | Thompson | 455/575.8 |
| 5,507,013 A | * | 4/1996 | Weadon | 455/90 |
| 5,649,309 A | * | 7/1997 | Wilcox | 455/90 |
| 5,715,524 A | * | 2/1998 | Jambhekar et al. | 455/575.3 |
| 5,828,965 A | * | 10/1998 | Brown et al. | 455/550 |
| 6,088,240 A | * | 7/2000 | Steinhoff | 361/814 |
| 6,104,808 A | * | 8/2000 | Alameh | 379/433 |
| 6,115,620 A | * | 9/2000 | Colonna | 455/569 |
| 6,215,993 B1 | * | 4/2001 | Ulveland | 455/415 |
| 6,314,183 B1 | * | 11/2001 | Pehrsson | 379/433.06 |
| 6,349,225 B1 | * | 2/2002 | Lands et al. | 455/575 |
| 6,434,371 B1 | * | 8/2002 | Claxton | 455/575.1 |
| 6,434,404 B1 | * | 8/2002 | Claxton et al. | 455/575.3 |

FOREIGN PATENT DOCUMENTS

| | | |
|---|---|---|
| DE | 197 08 120 C1 | 6/1998 |
| EP | 0 607 038 A1 | 7/1994 |
| EP | 0 661 824 A1 | 7/1995 |
| EP | 0 796 026 A2 | 9/1997 |
| FR | 2 768 011 A1 | 3/1999 |
| WO | WO 91/07836 | 5/1991 |
| WO | WO 93/07680 | 4/1993 |

* cited by examiner

Primary Examiner—Sinh Tran
Assistant Examiner—Eliseo Ramos-Feliciano
(74) Attorney, Agent, or Firm—Sughrue Mion, PLLC

(57) ABSTRACT

A portable telephone including a casing, a flap pivotable relative to the casing, the flap being able to assume a retracted position, a deployed position and an intermediate position. The telephone also includes means for sensing the position of the flap and a switch connected to the sensing means. The switch includes means for selecting an "off-hook" mode when the flap is in the retracted position or an "on-hook" mode when the flap is in the retracted position or a "hands-free" mode when the flap is in an intermediate position.

11 Claims, 3 Drawing Sheets

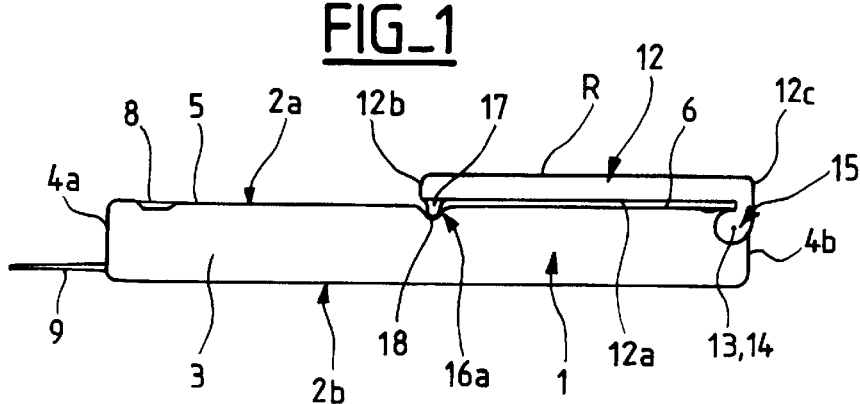
FIG_1
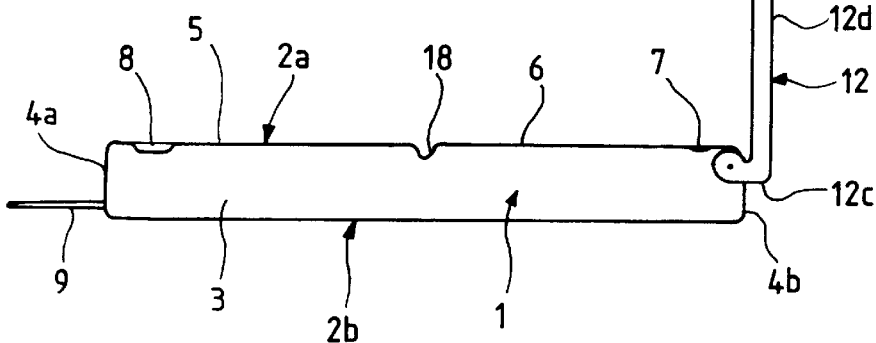
FIG_2
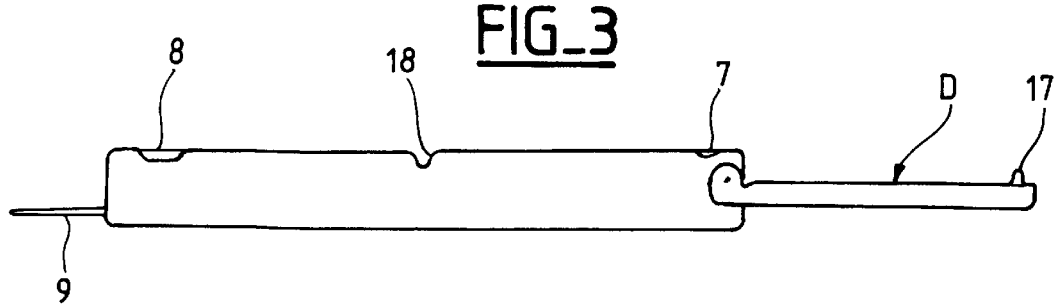
FIG_3

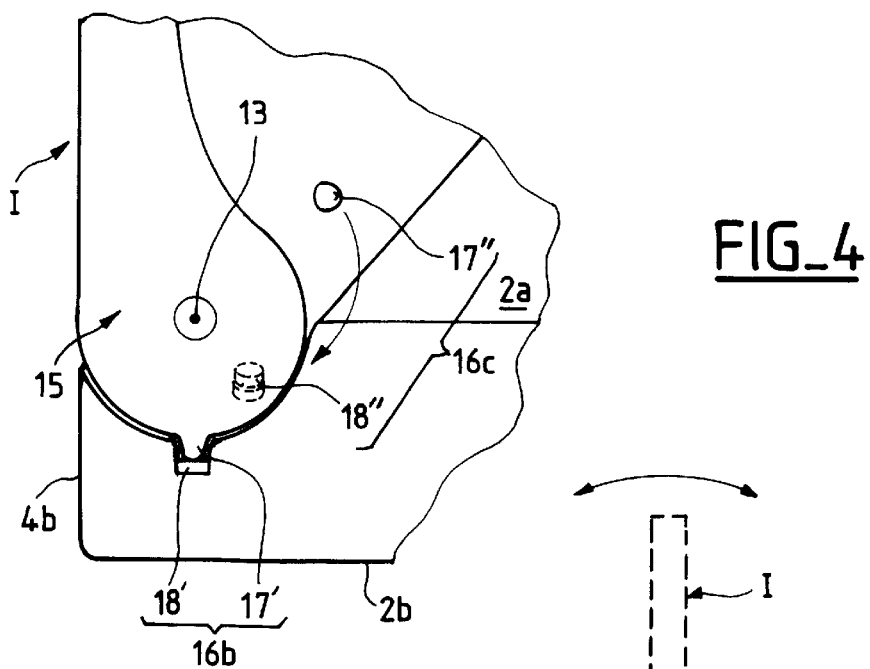
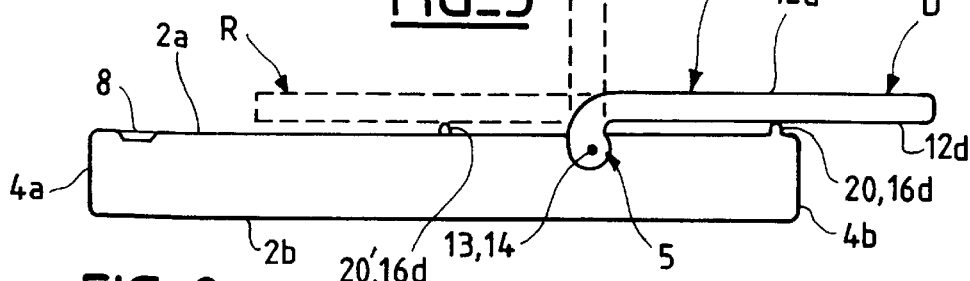
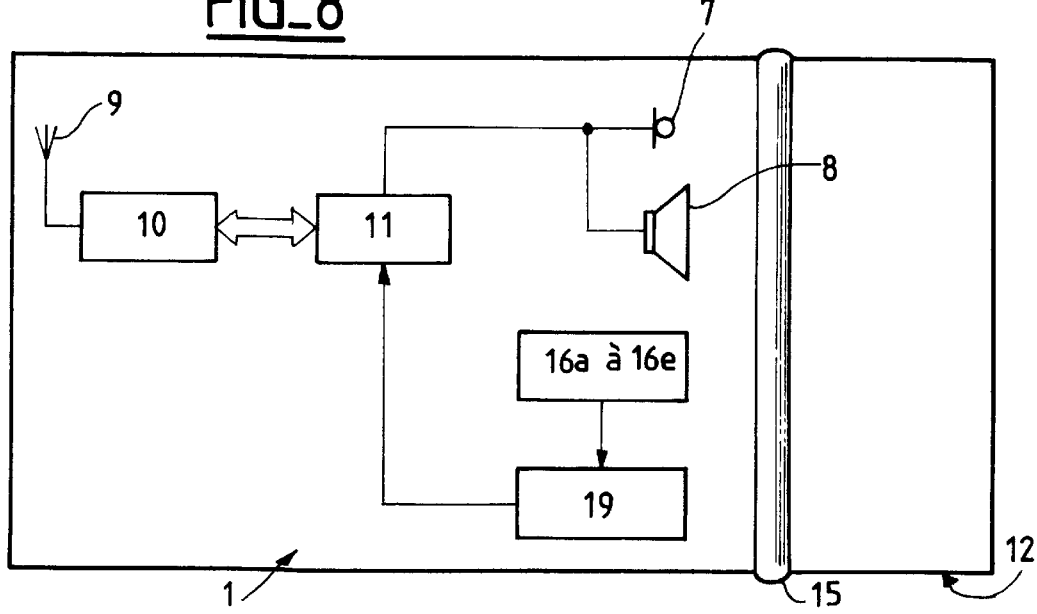

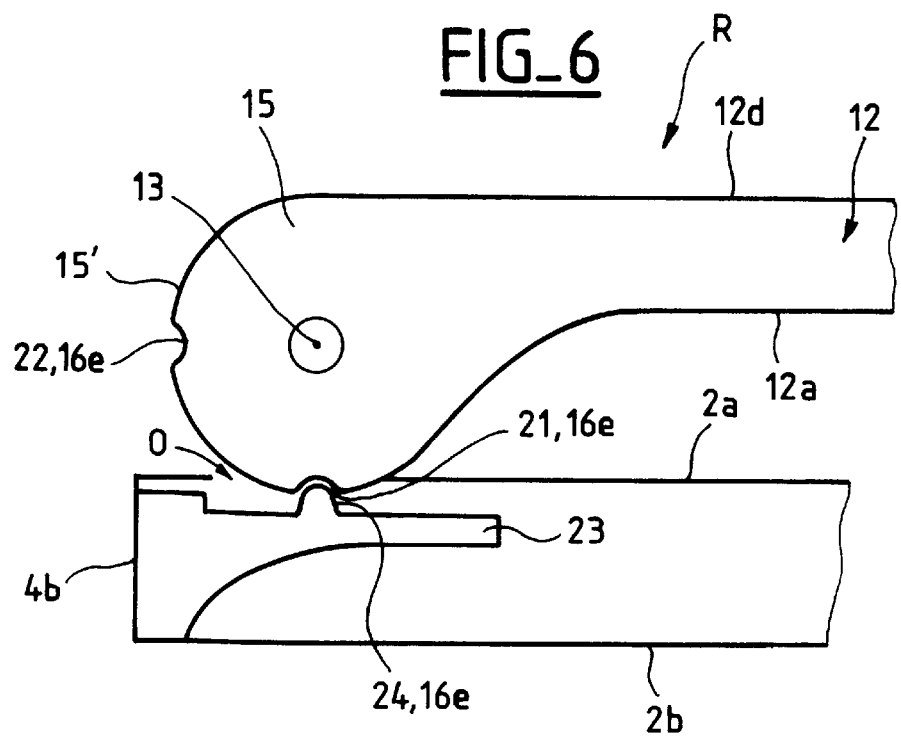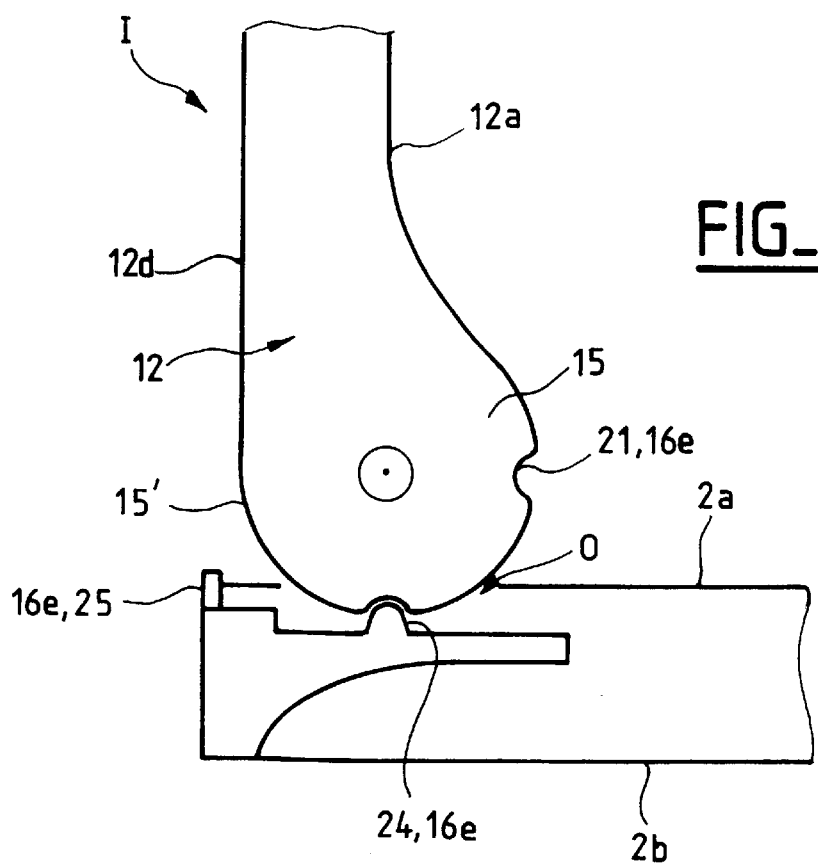

PORTABLE TELEPHONE WITH FLAP HINGED TO ITS CASING

FIELD OF THE INVENTION

The invention relates to a portable telephone having a casing and a flap pivotable relative to the casing.

The flap can assume various angular positions relative to the casing between two extreme positions:

a retracted position, in which the flap is retracted against the casing, for example to cover an alphanumeric keypad; and a deployed position, in which the flap is at an angle of substantially 180° to the casing.

The flap generally protects the keys in the retracted position and allows access to them in the deployed position.

The portable telephone also includes means for sensing the position of the flap and a switch connected to the sensing means to select an "off-hook" mode enabling a telephone call to be conducted when the flap is in the retracted position or an "on-hook" mode interrupting the telephone call in progress when the flap is in the retracted position.

BACKGROUND OF THE INVENTION

The expression "portable telephone" refers to any type of cordless telephone, for example telephones which are connected by radio to a base station connected to a public switched network, and to cellular telephones of a mobile telephone network, in particular a GSM network.

Many portable telephones have a "hands-free" mode enabling a call to be conducted without the user having to hold the telephone near the ear or mouth.

The sound level of the telephone is amplified so that the user can hear the conversation comfortably.

It is therefore essential for the hands-free mode to be activated only if the telephone is away from the ear or mouth.

Fixed systems are available, in particular for use in vehicles, which automatically select the hands-free mode immediately the telephone is placed on the fixed system.

However, this has the disadvantage of requiring the presence of an additional device.

In the absence of such fixed systems, the hands-free mode is activated or de-activated by selecting it using a key or a specific menu.

This is complicated, however, and activation is not automatic.

Other portable telephones have an infrared sensor adapted to sense the distance between the telephone and the user's mouth or ear. Threshold distances condition activation or de-activation of the hands-free mode.

Those telephones have the drawback of requiring additional components, which increases their size and cost.

OBJECT AND SUMMARY OF THE INVENTION

The object of the invention is therefore to eliminate the above drawbacks.

To this end, it proposes a portable telephone of the aforementioned type wherein the switch further includes means for selecting a "hands-free" mode when the flap is in a particular intermediate position.

Because this intermediate position of the flap during a call is uncomfortable for the user, it automatically causes the user to hold the telephone away from the head while the "hands-free" mode is activated.

In one particular embodiment of the invention, in the intermediate position the flap is at an angle of substantially 60° to 120° to the casing.

The means for sensing the position of the flap relative to the casing can be mechanical and/or electromagnetic.

The invention also provides a method of controlling a "hands-free" circuit of a portable telephone having a casing and a flap pivotable on the casing between a retracted position and a deployed position, wherein the "hands-free" circuit is activated when the flap is in a particular intermediate position and the "hands-free" circuit is de-activated when the flap is in the retracted position or the deployed position.

BRIEF DESCRIPTION OF THE DRAWINGS

The invention will be understood better in the light of the following detailed description with reference to the accompanying drawings.

FIG. 1 is a diagrammatic side view of a first embodiment of a portable telephone of the invention showing its flap in a retracted position.

FIGS. 2 and 3 are diagrammatic side views of the telephone shown in FIG. 1 respectively showing its flap in intermediate and deployed positions.

FIG. 4 is a fragmentary perspective sectional view of a second embodiment of a telephone of the invention, showing a variant of the sensing means and the flap in the intermediate position.

FIG. 5 is a diagrammatic side view of a third embodiment of a telephone of the invention, showing the folded, intermediate, and deployed positions of the flap.

FIGS. 6 and 7 are cross-sectional views to a larger scale of the hinge of a fourth embodiment of a telephone of the invention, respectively showing the flap in the retracted and intermediate positions.

FIG. 8 is a block diagram of the telephone of the invention.

MORE DETAILED DESCRIPTION

The portable telephone shown in the figures is a mobile telephone. The invention encompasses any radio telephone appliance for hands-free use, i.e. providing the telephone mode referred to as the "hands-free" mode.

The telephone has a generally rectangular casing 1 with two substantially parallel large faces, namely a front face 2a and a rear face 2b. The front and rear faces 2a, 2b are connected together by two opposite side faces 3 and by top and bottom faces 4a and 4b.

The front face 2a includes a screen 5, an alphanumeric keypad 6, a microphone 7 near the bottom face 4b, and a loudspeaker 8 near the top face 4a.

The telephone also includes an antenna 9 which can be inside or outside the casing 1, and a radio circuit 10 inside the casing 1 (see FIG. 8).

The radio circuit 10 is connected to a control circuit 11, usually a microprocessor.

When it receives radio signals, the antenna 9 converts them into electrical signals to be processed by the radio circuit 10. The data corresponding to the signals is then passed to the control circuit 11 which, if necessary, after processing it, sends it to the microphone 7 and to the loudspeaker 8.

The control circuit 11 is adapted to be configured in an "off-hook" mode, an "on-hook" mode or a "handsfree" mode.

In the "off-hook" mode, the user must hold the loudspeaker 8 near the ear and the microphone 7 near the mouth in order to converse with the other party.

In the "on-hook" mode, the user cannot converse with another party.

In the "hands-free" mode, the user can converse with the other party without having to hold the telephone near the head.

The means enabling hands-free use of the telephone include:

- at least one microphone capable of picking up the sound of the user's voice; and
- at least one loudspeaker for amplified output of sounds emitted by the other party.

The telephone also includes a generally rectangular flap 12 pivotable relative to the casing 1.

To be more precise, the flap 12 is hinged about a pivot axis 13 transverse to the front face 2a and parallel to the top and bottom faces 4a and 4b by means of a hinge 15 in the form of two hinge pieces on the flap 12 (see FIGS. 1 to 3 and 5).

In the embodiment shown in FIG. 4, the hinge 15 takes the form of a single hinge piece.

Clearly, in other embodiments the hinge 15 could comprise a different number of hinge pieces.

In the embodiment shown, the side faces 3 of the casing 1 have attachment points 14 for the pivot axis 13.

In FIGS. 1 to 4, the attachment points 14 are near the bottom face 4b. In FIG. 5 they are substantially halfway between the bottom face 4b and the top face 4a.

The hinge 15 of the flap 12 is a conventional hinge and is not described in detail here.

It is such that the flap 12 can move between two extreme positions:

- a retracted position R, in which the flap 12 is retracted against at least part of the front face 2a of the casing 1, and
- a deployed position D, in which the flap 12 is at an angle of substantially 180° to the front face 2a of the casing 1.

The flap 12 can also be moved to a particular intermediate position I between the retracted position R and the deployed position D.

In one particular embodiment, the flap 12 in the intermediate position I is at an angle of substantially 90° to the front face 2a of the casing 1.

In various embodiments this angle can vary from approximately 60° to approximately 120°.

In another embodiment, not shown, it is the flap 12 that includes the alphanumeric keypad 6 and/or the microphone 7, instead of the casing 1.

The control circuit 11 is programmed so that:

- the "off-hook" mode is activated when the deployed position D is sensed,
- the "on-hook" mode is activated when the retracted position R is sensed, and
- the "hands-free" mode is activated when the intermediate position I is sensed.

The control circuit 11 controls the sound level of the microphone 7 and the loudspeaker 8 according to the activated mode.

The telephone includes sensing means 16a, 16b, 16c, 16d and 16e for sensing the position of the flap 12 relative to the casing 1.

The sensing means 16a to 16e are on or inside the flap 12 and/or on or inside the casing 1.

In the embodiment shown in FIGS. 1 to 3, the flap 12 has a lug 17 on its inside face 12a adapted to face the front face 2a of the casing 1 in the retracted position R. To be more precise, the lug 17 is near the first free end 12b of the flap 12, opposite the hinge 15.

The lug 17 is rigidly and non-removably fixed to the inside face 12a.

When the flap 12 is in the position to be sensed, here the retracted position R, the lug 17 nests in a notch 18 forming a switch.

The notch 18 is in the front face 2a of the casing 1 and its shape is substantially complementary to that of the lug 17.

The notch 18 is electrically or mechanically connected to a switch 19 causing the control circuit 11 to activate the mode corresponding to the sensed position.

The lug 17 and the notch 18 therefore form first sensing means 16a.

Thus, in this case, the "on-hook" mode is activated when the retracted position R is sensed.

Second sensing means 16b, described below, near the hinge 15 sense the intermediate position I.

Referring to FIG. 4, the flap 12 has two lugs 17', 17" projecting over the hinge 15. The lugs 17' and 17" are similar to the lug 17. To prevent the lugs 17' and 17" impeding pivoting of the flap 12, a groove or equivalent means (not shown) is provided in the casing 1, the lugs moving in this groove as the flap 12 pivots.

The lugs 17' and 17" subtend an angle of approximately 90° at the pivot axis 13, depending on the angle between the flap 12 and the front face 2a of the casing 1 in the intermediate position I. The lugs 17', 17" are in two planes parallel to each other and perpendicular to the main plane of the flap 12.

Two notches 18' and 18" forming switches, connected to the switch 19, are formed inside the casing 1, in the part adapted to receive the hinge 15, so that either the lug 17' or the lug 17" comes into contact with the respective switch 18' or 18", depending on the position of the flap.

The lug 17' and the switch 18' form the sensing means 16b and the lug 17" and the switch 18" form the sensing means 16c.

The positions of the lugs 17' and 17" are such that:

- the lug 17' comes into contact with the switch 18' when the flap 12 is in the intermediate position I and the "hands-free" mode is activated, and
- the lug 17" comes into contact with the switch 18" when the flap 12 is in the retracted position R and the "on-hook" mode is activated.

In the embodiment shown in FIGS. 1 to 3, the intermediate position I and the retracted position R can be sensed but there are no specific means for sensing the deployed position D. The control circuit 11 selects the "off-hook" mode if the flap 12 is not in the intermediate position I or the retracted position R.

In a different embodiment, specific means for sensing the deployed position D could obviously be provided, for example means similar to the sensing means 16b or 16c.

In the embodiment shown in FIG. 5, the sensing means 16d include at least one plunger 20 projecting from the front face 2a of the casing 1.

To be more precise, there are two plungers 20, 20' on the front face 2a, on respective opposite sides of the hinge 15, so that if the flap 12 is in either the retracted position R or the deployed position D part of the inside face 12a (respectively outside face 12d) of the flap 12 comes into contact with the plunger 20, 20'.

Thus one plunger 20 is nearer the bottom face 4b of the casing 1 and the other plunger 20' is nearer the top face 4a.

The plungers 20, 20' are connected to the switch 19 electrically or mechanically so that when they are depressed the switch 19 selects the mode corresponding to the sensed position.

As in the embodiment shown in FIGS. 1 to 4, the "hands-free" mode is automatically activated if neither the deployed position D nor the retracted position R is sensed, i.e. if neither plunger 20 nor plunger 20' is depressed.

Specific means for sensing the intermediate position I can also be provided.

In the embodiment shown in FIGS. 6 and 7, sensing means 16e are provided near the hinge 15 between the flap 12 and the casing 1.

Thus each hinge piece has two notches 21, 22 on its outside edge 15'.

The angle subtended by the notches 21, 22 is approximately 90°. This angle obviously depends on the angle between the flap 12 and the front face 2a of the casing 1 in the intermediate position I.

Two arms 23 which are preferably flexible and act as springs are fixed to the bottom face 4b of the casing 1 and directed towards its top face 4a.

The two arms 23 are substantially parallel to each other in a common plane parallel to the front face 2a of the casing 1.

Each arm 23 faces the hinge 15.

Each arm 23 includes an abutment 24 which projects towards and is perpendicular to the pivot axis 13.

The front face 2a includes an opening 0 facing the portion of the arm 23 including the abutment 24.

The abutments 24 have a shape adapted to receive the notches 21 and 22 of the hinge pieces 15a, 15b.

They are connected to the switch 19 electrically or mechanically.

The positions of the notches 21, respectively 22, and the abutments 24 are such that when the flap 12 is in the retracted position R, respectively the intermediate position I, the notches 21, respectively 22, co-operate with the corresponding abutment 24.

The retracted position R is therefore sensed and the associated "on-hook" mode activated when the notches 21 of the hinge pieces are engaged with the abutments 24 of the arms 23.

Similarly, the intermediate position I is sensed and the associated "hands-free" mode is activated when the notches 22 of the hinge pieces are engaged with the abutments 24 of the arms 23.

In the embodiment shown in FIG. 6, there are no means for sensing the deployed position D. Consequently, the "off-hook" mode is activated if neither the retracted position R nor the intermediate position I is sensed.

In the embodiment shown in FIG. 7, there is a pushbutton 25 on the front face 2a of the casing 1, near its bottom face 4b.

The pushbutton 25 projects towards and is perpendicular to the pivot axis 13 and is connected to the switch 19.

It is depressed by the outside face 12d of the flap 12 in its deployed position D, the depressed position of the pushbutton 25 activating the "off-hook" mode.

In a different embodiment, there could be a single arm 23 with two abutments 24 adapted to co-operate with the notches 21 and 22 of the two hinge pieces. In the case of a hinge 15 with a single hinge piece, there could be a single arm 23 with a central abutment 24 adapted to co-operate with the notches of the hinge piece.

In a different embodiment, the sensing means 16a to 16e of the embodiments just described could be combined.

In the embodiments described the sensing means 16a to 16e are mechanical.

They could nevertheless be electromechanical or electromagnetic.

Thus, in one embodiment, the sensing means could include a magnet in the flap 12 and an electrical component responsive to magnetic fields, for example a Hall effect sensor, in the casing 1 and connected to the switch 19.

The opposite arrangement, with the magnet in the casing 1 and the electrical component in the flap 12, is also feasible.

Other embodiments of the sensing means are also feasible.

What is claimed is:

1. A portable telephone including:
   a casing:
      a flap pivotable relative to the casing and able to assume different angular positions relative to the casing between two extreme positions:
         a retracted position R, in which the flap is retracted against the casing, and
         a deployed position D, in which the flap is at an angle of substantially 180° to the casing;
   means for sensing the position of the flap; and
   a switch connected to the sensing means to select an "off-hook" mode enabling a telephone call to be conducted when the flap is in the deployed position or an "on-hook" mode in which a user cannot converse when the flap is in the retracted position, wherein the switch further includes a means for selecting a "hands-free" mode when the flap is in a particular intermediate position
   wherein the switch selects a mode of operation by a user solely moving the flap.

2. A portable telephone according to claim 1, wherein, in the intermediate position the flap is at an angle of substantially 60° to 120° to the casing.

3. A portable telephone according to claim 1, wherein the sensing means are on the casing and/or on the flap.

4. A portable telephone according to claim 3, wherein the sensing means are on the free end part of the flap adapted to face the casing.

5. A portable telephone according to claim 3, wherein the sensing means are near the hinge between the flap and the casing.

6. A portable telephone according to claim 3, wherein the sensing means are mechanical.

7. A portable telephone according to claim 6, wherein the sensing means include a lug on the flap and a notch in the casing of complementary shape to the lug and forming a switch, so that when the flap is in the position to be sensed the lug nests in the notch, which is connected to the switch in order to select the corresponding mode.

8. A portable telephone according to claim 6, wherein the sensing means include at least one plunger on the casing so that when the flap is in the position to be sensed a portion of the flap comes into contact with the plunger, which is connected to the switch in order to select the corresponding mode.

9. A portable telephone according to claim 3, wherein the sensing means are electromagnetic.

10. A portable telephone according to claim 9, wherein the sensing means include an electrical component responsive to magnetic fields in the casing, respectively the flap, and a magnet in the flap, respectively the casing.

11. A method of controlling a portable telephone, the method comprising:

a control circuit of the potlable telephone programmed to determine a position of a flap with respect to a casing, wherein the portable telephone has three separate modes of operation depending on the determined position of the flap;

the three separate modes comprising:

a retracted position, in which the flap is retracted against, at least a part of the casing, wherein a user cannot converse with another party;

a deployed position, wherein a user must hold the portable telephone in order to converse with another party;

an intermediate position, in which the flap is between the retracted position and the deployed position, wherein a user can converse with another party without having to hold the portable telephone;

wherein the control circuit determines the position of the flap by a user solely moving the flap.

* * * * *